United States Patent [19]

Pryor

[11] Patent Number: 5,721,677
[45] Date of Patent: *Feb. 24, 1998

[54] VISION ASSISTED FIXTURE CONSTRUCTION

[75] Inventor: Timothy R. Pryor, Tecumseh, Canada

[73] Assignee: Sensor Adaptive Machines, Inc., Windsor, Canada

[*] Notice: The term of this patent shall not extend beyond the expiration date of Pat. No. 5,267,143.

[21] Appl. No.: 467,797

[22] Filed: Jun. 6, 1995

Related U.S. Application Data

[62] Division of Ser. No. 158,310, Nov. 29, 1993, Pat. No. 5,455,765, which is a division of Ser. No. 866,653, Apr. 8, 1992, Pat. No. 5,267,143, which is a continuation of Ser. No. 643,905, Jan. 22, 1991, abandoned, which is a continuation of Ser. No. 525,706, May 21, 1990, abandoned, which is a continuation of Ser. No. 382,497, Jul. 21, 1989, abandoned, which is a division of Ser. No. 113,363, Oct. 27, 1987, Pat. No. 4,851,905, which is a continuation of Ser. No. 22,596, Mar. 4, 1987, abandoned, which is a continuation of Ser. No. 660,279, Oct. 12, 1984, abandoned.

[51] Int. Cl.⁶ .................................... G06F 19/00
[52] U.S. Cl. .................. 364/167.01; 29/407.1; 364/478.01; 395/94
[58] Field of Search .............. 364/167.01, 191–193, 364/559, 478, 478.01; 395/89, 94; 901/9, 42, 46, 47, 45; 414/730; 348/86, 94, 95; 29/759, 559, 897.1–897.35, 406, 407, 418, 464–468, 703, 709, 714, 720, 721, 701, 702

[56] References Cited

U.S. PATENT DOCUMENTS

| | | | |
|---|---|---|---|
| 3,577,153 | 5/1971 | Yagi et al. | 358/93 X |
| 3,798,795 | 3/1974 | Michelsen | 358/125 X |
| 4,044,377 | 8/1977 | Bowerman | 358/107 |
| 4,064,528 | 12/1977 | Bowerman | 358/125 X |
| 4,146,924 | 3/1979 | Birk et al. | 364/559 X |
| 4,187,051 | 2/1980 | Kirsch et al. | 364/513 X |
| 4,187,501 | 2/1980 | Kirsch et al. | 364/478 X |
| 4,219,847 | 8/1980 | Pinkney et al. | 358/105 X |
| 4,255,765 | 3/1981 | Van Mansvect et al. | 358/225 |
| 4,291,867 | 9/1981 | Williams et al. | 29/721 X |
| 4,396,945 | 8/1983 | DiMatteo et al. | 358/107 |
| 4,453,085 | 6/1984 | Pryor | 364/513 X |
| 4,488,173 | 12/1984 | DiMatteo et al. | 358/903 X |
| 4,523,100 | 6/1985 | Payne | 364/513 X |
| 4,527,198 | 7/1985 | Callahan | 358/125 X |
| 4,545,102 | 10/1985 | Grabos | 29/407 |
| 4,553,309 | 11/1985 | Hess et al. | 29/450 |
| 4,590,578 | 5/1986 | Barto, Jr. et al. | 901/47 X |
| 4,615,093 | 10/1986 | Tews et al. | 395/94 |
| 4,628,464 | 12/1986 | McConnell | 395/94 |
| 4,641,819 | 2/1987 | Polano | 269/45 |
| 4,651,283 | 3/1987 | Sciaky | 364/167.01 X |
| 4,796,200 | 1/1989 | Pryor | 364/513 |
| 5,267,143 | 11/1993 | Pryor | 364/167.01 |

OTHER PUBLICATIONS

Flachs et al.— "An Automatic Video Tracking System," —IEEE Proc. Naecon; May 1977; pp. 361–368.

*Primary Examiner*—Joseph Ruggiero
*Attorney, Agent, or Firm*—Larson & Taylor

[57] ABSTRACT

A new method and apparatus for fabrication or alignment of fixtures, jigs and structures is disclosed. The invention uses target points on one or more details which are referenced to the overall structure via targets on the details. These targets are monitored by a TV camera unit which is alternatively interfaced to a display for the human operator or a robot to provide position data. The interface may include input from a CAD system which allows display on robot coordinates to be offset by design data of the structure or a part to be located on it.

While mainly envisioned for assistance in constructing fixtures for automobile assembly, the disclosed invention is widely useable for all types of construction including aircraft, bridges, boats, buses, houses, buildings and the like. A means for improving resolution of automatically served camera based systems is also disclosed.

29 Claims, 4 Drawing Sheets

VISION ASSISTED FIXTURE CONSTRUCTION

This application is a division of application Ser. No. 08/158,310 filed Nov. 29, 1993, now U.S. Pat. No. 5,455, 765, which was a division of application Ser. No. 07/866, 653 filed Apr. 8, 1992, now U.S. Pat. No. 5,267,143, which is a continuation of application Ser. No. 07/643,905, filed Jan. 22, 1991, now abandoned, which is a continuation of application Ser. No. 07/525,706 filed May 21, 1990, now abandoned, which is a continuation of application Ser. No. 07/382,497 filed Jul. 21, 1989, now abandoned, which is a division of application Ser. No. 07/113,363 filed Oct. 27, 1987, now U.S. Pat. No. 4,851,905, which is a continuation of application Ser. No. 07/022,596 filed Mar. 4, 1987, now abandoned, which is a continuation of application Ser. No. 06/660,279, filed Oct. 12, 1984, now abandoned.

BACKGROUND

This application incorporates by reference the following copending applications.

1. Targets Ser. No. 348,803, now U.S. Pat. No. 4,654,949
2. Robot Calibration Ser. No. 453,910, now U.S. Pat. No. 4,753,569
3. Pulsed Robotic Inspection, now U.S. Pat. No. 4,585,350
4. Pulsed Robotic Inspection CIP, now U.S. Pat. No. 4,838,696

Copending applications by the inventor have discussed target based guidance concepts for robot in machinery control which can lead to higher accuracy, lower cost, higher speed and other desirable solutions in a reliable, accurate manner capable of widespread application.

This disclosure extends this idea toward specific problems related to the manufacture of car bodies, aircraft structures, covering and both the assembly of the components and the fixtures that assist in this assembly.

One embodiment of the invention aids in manufacture of fixtures. Quite clearly, the construction of high precision fixtures for either assembly fixtures, weld fixtures or check fixtures required by today's manufacturer of aircraft and automobiles is an extremely expensive and time consuming proposition. It is estimated for example that within one large-automobile manufacturer in North America, at least $2 Billion in such fixtures at any one time are circulating. When new car lines come out the fixtures for the previous line become scrap.

What's worse, the fixture costs generally have a long time delay in their delivery. Since this is an area where numerous engineering changes occur during the engineering of the car, widespread last minute changes in the fixtures are required which causes enormous cost escalations plus further adds to the delays in getting the car lines to the market which can lead to significant lost market share consequences.

What is disclosed herein is a novel target based technique to assist in the construction of fixtures in either a manual or an automatic manner greatly reducing the cost and the delivery time.

A particular area of interest is the disclosure of target based equipment which can aid an operator or a robot in the positioning of check, locating or other actual assembly details onto the fixtures as well as the linking of such data to the CAD data systems for the part and/or fixture.

Fixtures constitute a large percentage of the cost of tooling for new body styles and their construction interjects into any new model program a considerable time delay. Computer aided automatic vision based metrology systems can be utilized to materially speed up this effort to both reduce costs and quicken the delivery time of such fixturing.

Besides the obvious increased cost effectiveness, the system proposed has two other major advantages. First, it is directly interfaceable to CAD systems and therefore totally amenable with future thrusts in math model car design and build.

The second thing, is that the real time nature of the data provided allows the system to first be utilized in a manual mode, upward to semi automatic and then finally to full robot fixtureless assembly using the same basic concepts founded on metrological principles.

This proposal is generally related in some aspects to the procedure of laying out large fabricated fixtures and other objects using theodolites. Such theodolites which currently become digitized with reliable programming allow a considerable simplification of the layout procedure and can materially aid in the checkout of fixtures and other structures.

However, the use of such theodolites does very little for the person actually charged with constructing the fixture. What is proposed here however is a dynamic interactive target based system used by itself or in conjunction with theodolites which actually allow fabrication of the object itself taking data concerning the part for which the fixture is to fit, such as a body side or what have you from the CAD data base and feeding to a sensor unit that is capable of seeing the detail to be assembled and possibly the part such as a framework or other detail to which it is to be mated.

In the first case, this allows an operator to position the detail in computer defined space, rapidly and easily from which it would then be locked down via welding, lock screws or what have you. In addition, the process provides an automatic check, again relative to computer data space for the fixture using the part data master. In short, this is an entirely CAD compatible manufacturing process which can start out manually —a big advantage.

In future applications, the process can be further automated with robots handling one or more of the positioning, welding, or attaching tasks. It is not all far removed to consider that fixtures themselves could be robot constructed.

The step beyond that is to eliminate fixtures entirely using the robots to essentially form the fixture in a sequential mode. However, this is not thought to be generally applicable but certainly could be applicable on certain sub assemblies, details or the like. The beauty of this whole idea is that it can start simply off-line in the fixture build and in the end turns out to what may be the key to the whole line itself, all the while saving large sums of money and time.

The process is not necessarily limited solely to the fabrication of fixtures. Other conveyor details including nesting fixtures, possibly even dies and molds could fit this as well.

In addition, the technique here is widely useable to contruction of structures in general such as aircraft wing sections, houses, bridges and anything else where detail members are to be assembled to a framework.

Figure 1:
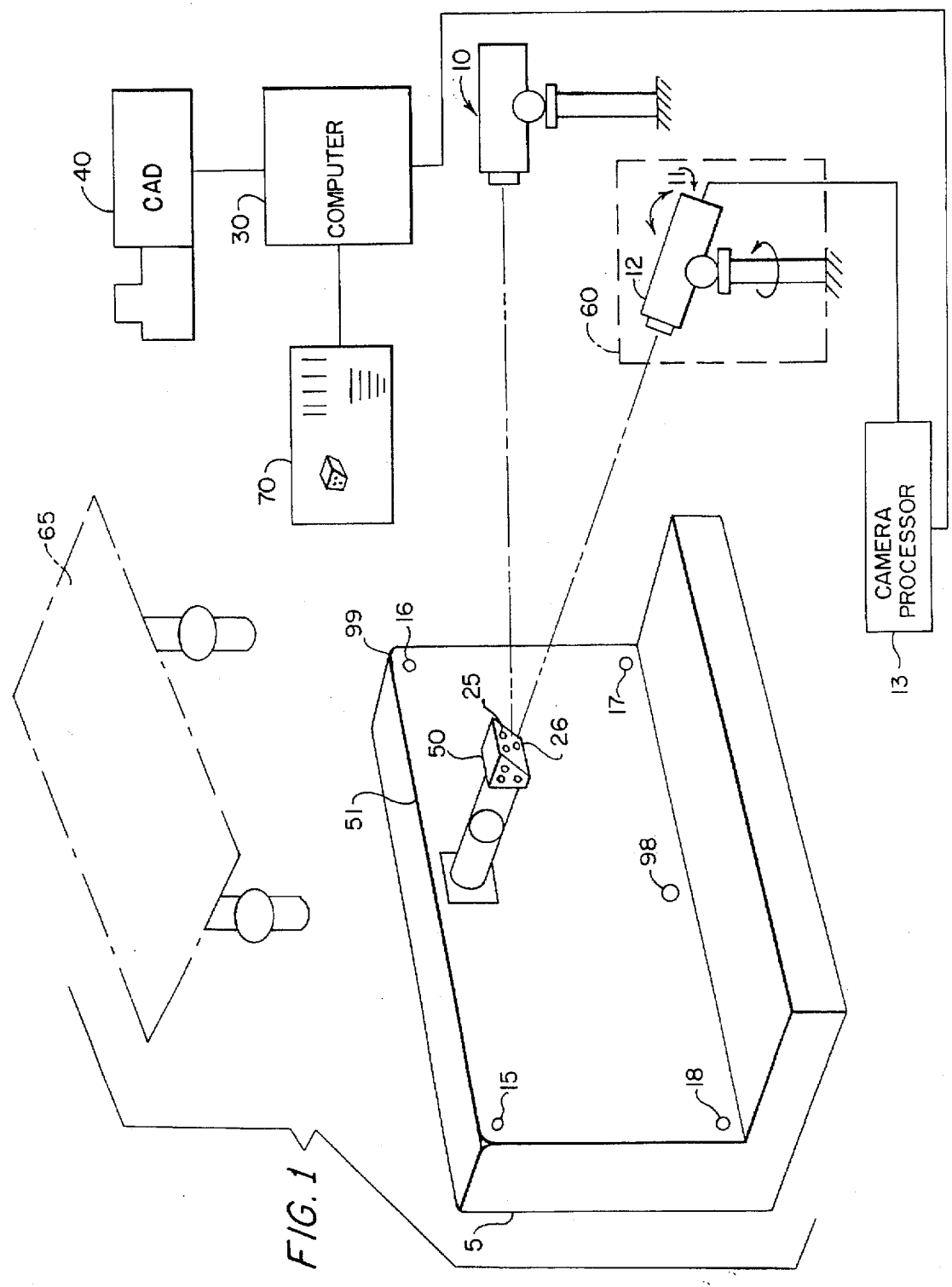
FIG. 1 illustrates a basic detail to fixture structure embodiment.

FIG. 1 illustrates the concept of the device. A framework, 5, let us say a weld fixture for a car, is to be set up with details which for the moment are just simply locating details which may have a complex curvature on their face. This could however be weld guns or anything else for that matter.

A theodolite system or other device is utilized to establish the general framework of the fixture in space to which the various details are to be attached. At each attaching point, a detail itself is targeted with 3 or 4 dot targets.

The camera unit is pointed at the fixture detail in a known manner to the laid out framework. This can be taken directly from the theodolite computers or other data entered. The details are then positioned by the operator by looking at a screen which tells him how to position it, the data coming from both the camera unit telling the position and the CAD data telling the desired position. When the operator has the part positioned properly, he then locks it down using whatever means is practicable such as spot welds, bolts, what have you.

The particularly easy thing to imagine would be locators on Gimbled or ball mounts. This would allow the operator to relatively easily position it in multi degrees of freedom under robot guidance control after which he would then lock it drawn in a more secure manner.

Reference is made to U.S. Pat. No. 4,654,959 which generally shows automatic sensor techniques for determining target position.

The impact on production of such fixture construction is substantial. In a large auto company alone, approximately $2 Billion in fixtures are in use at any one time. The vast majority are scrapped when new styles are introduced. It is estimated that this invention could save half the cost of such fixtures and allow much faster delivery, assisting manufacturers in responding to market demand (for different styles, etc.). A comparison is in order. Today the following steps are required to build a precision check fixture (for a car door say).

Present Fixture Build

1. NC block (detail)
2. Scribe lines on N/C block.
3. Build up precision detail on bench (L-unit).
4. Precision mount above to precision base
5. Precision check.

With the invention, only two steps are required.

Target Fixture Build

1. NC block detail including target points.
2. Precision assembly and check (simultaneous) with camera based auto theodolite system connected to CAD design base.

Implied is much less manual labor.

Steps of operation, FIG. 1:

1. Determine location of structure frame using, for example (but not limited to), automatic theodolite pair 10 and 11 and target points 15, 16, 17, and 18 (more targets would be required if more complicated than a simple plate or rectangular frame).

2. Using computer 30 to analyze said determined target data, and in regard to design data from CAD system 40 for either the structure or a part to be held by it, derive correct location for a locator such as 50.

3. Position at least one theodolite such as 11 at a position above to see at least two targets such as 25 and 26 on said locator (typically 3 or 4 are used). This positioning can be manual or automatic from data from computer 30.

4. Derive from the camera 12 of said automatic theodolite at least one coordinate of said locator relative to said camera.

5. Process the image of said camera using camera processor 13 connected to computer 30 data to obtain location variance relative to desired location.

6. Display on display 70 (or transmit—i.e. to a robot) movements needed to position locator at location desired.

Typically, theodolites 10 and 11 are placed on a floor at known locations relative to each other. Alternatively, they can be co-located on a stiff plate or other support such as 60 wheeled around for the purpose to the job. This plate could also be overhead, (with theodolites upside down) such as 65 shown in dotted lines, either fixed or brought in on a slide or crane way (very desirable for floor space, but implies automatic operation).

Note that the NC blocks of the detail can have multiple sets of targets on different faces to allow views thereof, with each targets relation to the working surface known. For maximum visibility, targets can stick up from the surface but this can lead to damage.

Figure 2A:
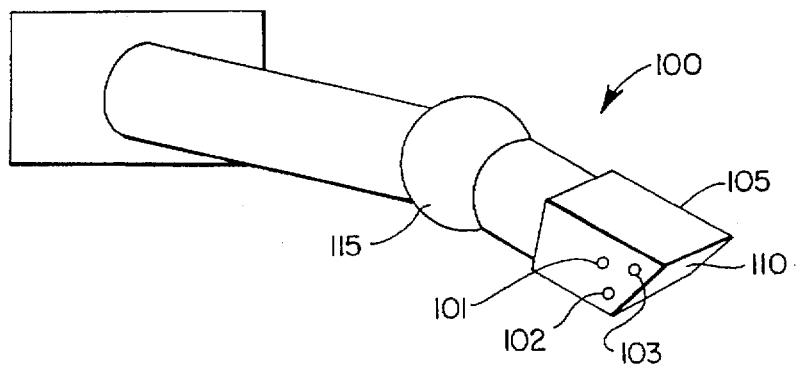
FIGS. 2a, 2b and 2c illustrates closeups of a detail.

FIG. 2a illustrates a closeup of a detail 100 useable on a typical fixture. The target 101–103 points on block 105 are NC machined in relationship with the contoured surface 110 (and perhaps on it). This is a big advantage over using hand scribed target points scribed on later.

Figure 2B:
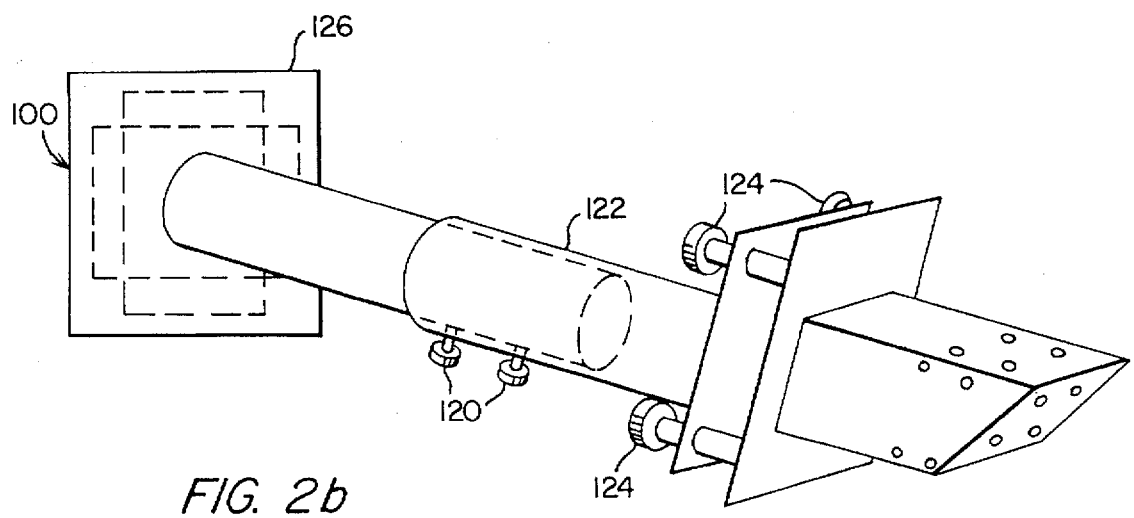

One type of adjustable universal detail moveable in multiple axes is shown in FIG. 2b. This is capable of positioning the target block in 4–6 axes. z axis slide and rotation about z axis with set screws 120 for tube 122, pitch and yaw adjustment with three screws 124, and optional x and y axes slide for base in mounting plate 126—note mounting plate 126 can itself be targeted to allow for quick placement in a nearly correct position). Other devices with ball joints etc. are also possible (e.g. 115).

For automatic reading, a spot target (FIG. 2c) is better (i.e. more accurate) than a scribed cross hair and can be formed using retro reflective tape 370 (e.g. Scotchlite 7615) formed on a dowel pin or disc 171 sunk into NC machined hole 172. If desired, contoured surface 180 for locating detail can be provided with targets 182.

Figure 3:
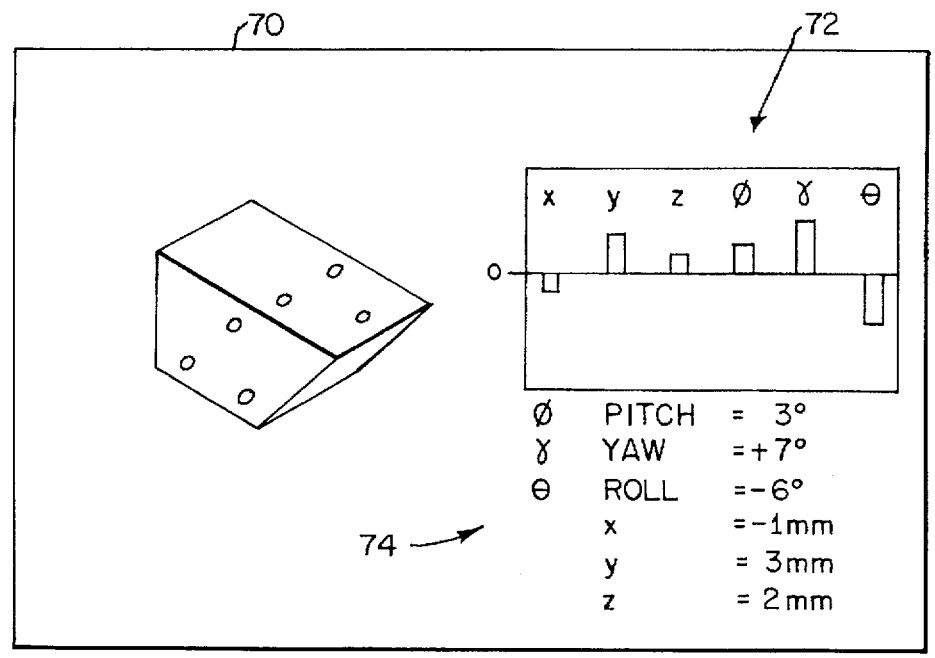
FIG. 3 illustrates a display according to the invention.

FIG. 3 illustrates a display 70 useable by an operator to visualize up to 6 degree of freedom data and to receive other written or pictoral messages from the control computer 30. For best operation, display update rate should be in real time (e.g. faster than 1/10 sec.) to avoid flicker. In any case, the display should show new data in less than a few seconds to avoid overly long response time. As shown in FIG. 3, display 70 can include an actual TV image of the object, or a solid model representation generated from CAD data and computer 30 to display object position in a space relative to the operator's frame of reference such as framework 5. A bar graphics display 72 and a written message or data display 74 are also preferably included in display 70.

An alternative to dynamic display via real time target monitoring is to tell the operator (or robot) which moves to make, which he or it then makes, arriving at the final position (subject to a further inspection step) using the accuracy of the device used to make the move, rather than by using the target data itself to rapidly 'home in' on the final location. This is slower, but workable, however, it requires accurate multi-degree of freedom positioners rather than inexpensive mounts for the details, and it requires the positioners to be accurately located relative to the overall structure, implying added target steps or precise construction, both less desirable.

Note the display can display any or all of the following at one time—written data, instructions, image of detail or structure, bar or other variance chart, solid model of detail, etc.

Of considerable importance is the fact that the various offset data etc. could be fed to the operator's alignment display from a CAD system. In other words, the operator wouldn't just line up the object to be normal to the viewing axis of the camera and along its axis, but instead to computer generated offsets in perhaps all 6 degrees of freedom from that axis. That axis itself would have been determined referencing from the larger structure using the theodolite (or other means).

Figure 4:
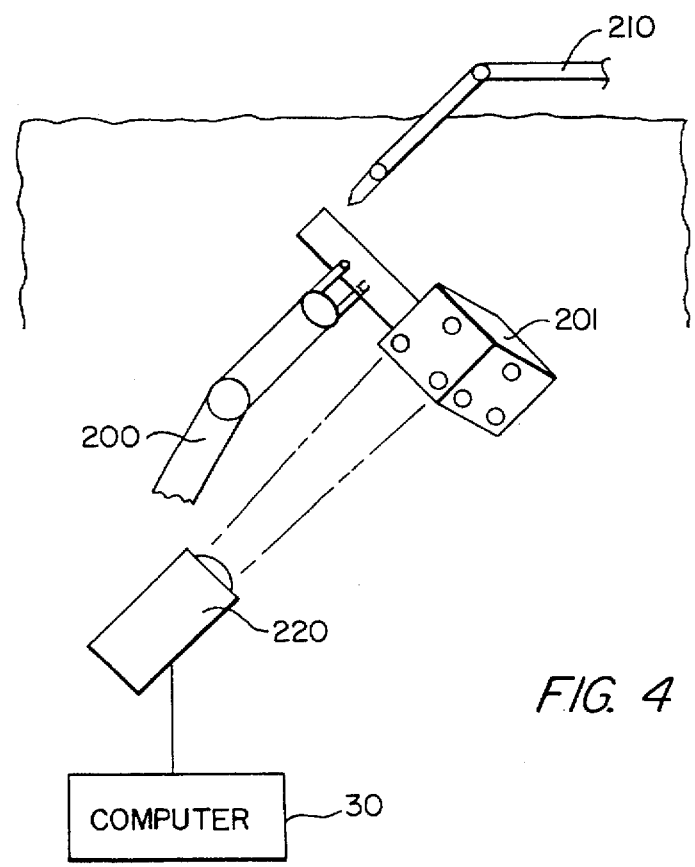
FIG. 4 illustrates a robotically positioned detail.

FIG. 4 illustrates a robot means 200 for holding a detail 201 in place while an operator or other robotic means locks down the detail, e.g. with a welder 210. After lock down, camera 220 verifies that the location of detail 201 is correct, which location is stored in memory of computer 30.

Figure 5:
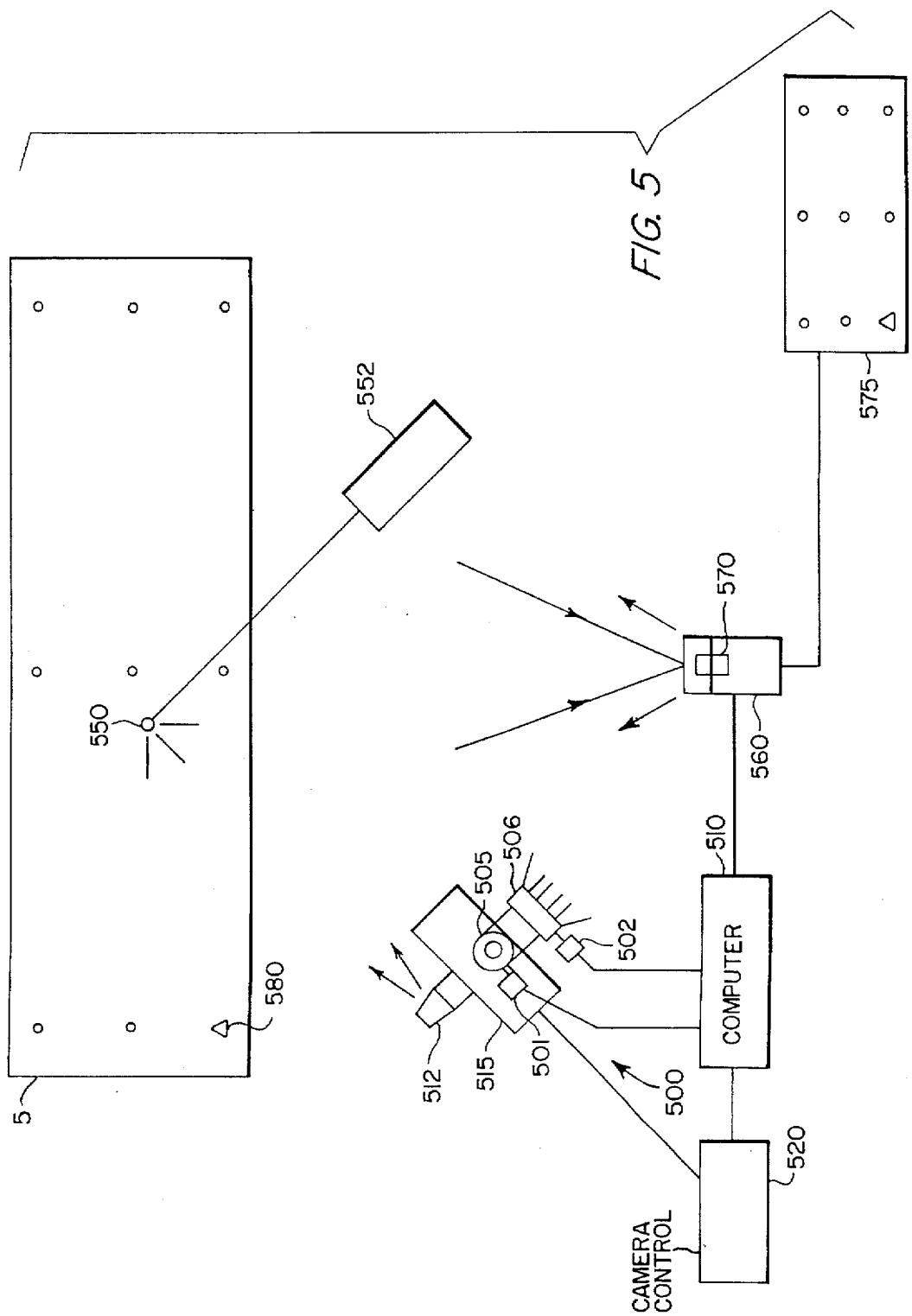
FIG. 5 illustrates an automatic theodolite with accuracy enhanced camera system.

FIG. 5 illustrates an automatic 'theodolite' such as 500 consisting of a motorized θ and θ axes 501 and 502 equipped with high resolution angular position sensors 505 and 506. Motors are controlled by computer 510 as is solid state TV camera 515 (eg. a GE TN2500) via camera control 520. Linear arrays such as Reticon 1024G can be used but are generally less useful as they only see in one plane.

Figure 2C:
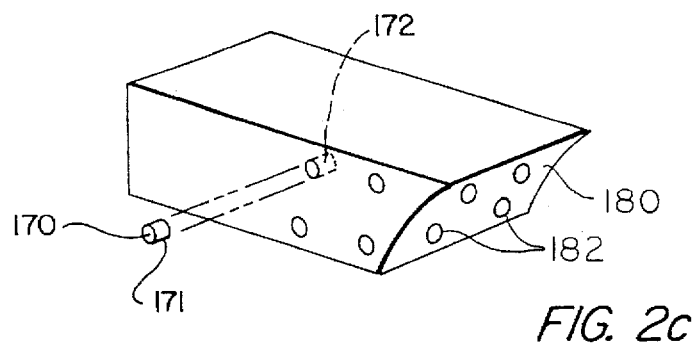

While normally used for target location, the camera can also be used to see other features of an object or structure such as pertinent hole locations, edges, corners or the like (for example, hole 98 or corner 99 of structure 51). Indeed such features once identified can be used as target points for the purposes of this invention. Normally, however, precision special target points such as shown in FIGS. 2a, 2b and 2c which are either retro reflective or actively lit, for example via fiber optics wherein, an end of the fiber constitute the target (see U.S. Pat. No. 4,654,949, offer much higher contrast and accuracy, and by their contrast are clearly distinguishable as targets from the background with no identification problem.

For the most common case of retro reflective targets, a light 530 with beam splitter is located along camera axis to provide a good return signal.

Several techniques for accurately measuring and tracking are now disclosed.

First, two such theodolites as in FIG. 1, can be served to go to each target point of a structure in sequence or separately to sequentially take target data. For example, if the data base of the structure is known, each theodolite (or one individually) can be served to point at say target 525 (or target set) and determine deviation from data base prediction. Interestingly each can do it at random, matching the two theodolites data, target for target, after the fact if desired.

Where the data base is being generated, the theodolites can servo together by projecting a laser spot such as 550 in FIG. 5) or other point co-axially from one theodolite 552 (master) and locking the second (slave) onto that spot. When the master unit sees a target in its field, one or both can read (the laser is desirably turned off at this time) and the system proceeds.

One could clearly raster scan throughout space to find all the targets on a large structure or whatever. However, it is often easier to use a camera such as 560 operating at much less magnification, and use an intense point source 570 to illuminate the whole structure or a portion, identify (manually) say with a display 575, or automatically, and rough locate the targets. Then the two theodolites are served by computer 510 to find these targets which are now known in their approximate locations.

Target designs for locators or other details can be all alike (e.g. ¼" dots) or can be varied and indeed can be coded, either by shape, grouping of spacing (e.g. triangular target 580) to identify which locator is being looked at, for example this allows easy random access of structure points by independently scanning theodolites for example.

The actual target discrimination can be done on-the-fly by pulsing the light source 512 (strobe) to freeze the target image position on the camera matrix array at a given point in time when angular positions are known (i.e. at an encoder count point). Super fast bursts can be used to minimize blur using a diode laser (30 nsec burst) as the light source. Xenon strobes can be Used as well.

Readout of target position on the matrix array gives target location. This is ideally done at high speed, and at high accuracy, for example using the invention of Pinckney et al (U.S. Pat. No. 4,219,847).

An alternate to pulsing is to continuously read target spot (or other) image positions very fast and record the spot location which corresponds to an encoder count. Often this is difficult do, and techniques such as shown in U.S. Pat. No. 4,595,350 and 4,838,696 are desirably employed. (The target image spots in this case are equivalent in this regard to the triangulation spot images discussed therein.) Indeed, such techniques are crutial for theodolite work since very high accuracy is required.

Accuracy obtained can be quite high. For example, suppose the angular axes are encoded with precise angular encoders as those made by Heindenhan good to 2 arc seconds ($9.6 \times 10^{-6}$ rad), each (an easily obtainable figure).

The trip points are known to be good to one part in ten of this value or 0.2 arc sec. (approx. $10^{-6}$). At a distance of 400 inches (approx. 10 meters) this represents $4 \times 10^{-6}$ inches.

A magnification of the camera lens system (telescope) of 30:1 means that a field of 7.5×7.5 inches can be viewed on the 0.25 inch×0.25 inch detector array, a good choice as many details might have target clusters on 2 inch centers, thus multiple targets can be seen in one view. Using Pinckney or other means such as U.S. patent or to to determine target spot location, such location can be reliably determined to 1/5000 or better. This then is $1.25 \times 10^{-3}$ inches, which at R=300 inches is $4.1 \times 10^{-6}$ rad, approximately the resolution of the trip point of the angular encoder. At higher magnification, it could be the same.

When the theodolite is statically positioned, it seldom can point better than the limiting resolution (2 arc sec in the example) of its axis encoders, and this limits the control systems resulting ability to put it there any better. The read on-the-fly unit can do better than a statically positioned theodolite.

To expand on this, when reading on-the-fly, one can interpolate between encoder counts by:

1. Pulsing the light source precisely at an encoder count trip point and reading the TV camera (preferably a solid state array type) to pick up accuracy of target point location.

2. By moving at a constant rotational speed, one can interpolate between counts, allowing the cameras to read at any desired point. Note that an auxilliary rotational or axial movement can be added (e.g. using a piezo electric device) to read super precisely over a very small zone.

3. Storing the beginning and end points at which camera data is taken, and determining the mid point of the encoder position which generally is corresponding to the mid point of the target spot during the time of motion, since the target spot image can blur on camera if the light source is of longer duration.

The dual theodolite automatic system, when implemented with a laser source in one theodolite, can be used for contouring an arbitrary object by simply projecting the spot sequentially on the surface of the object and looking at it with the other theodolite, recording the angular relation of the two which gives the contour answer.

What is claimed is:

1. A method of providing a fixture for holding a part comprising:

providing a base;

attaching a plurality of part support members to said base for supporting a part in a supported position on said base;

sensing data related to the location of said part support members; and automatically adjusting at least one of said part support members to accommodate a part to be supported, said adjusting being controlled in response to said sensed data.

2. A method according to claim 1, wherein said sensing is performed electronically.

3. A method according to claim 2, wherein said sensing is electro-optical.

4. A method according to claim 2, wherein said sensing is in 3 D.

5. A method according to claim 1, wherein said sensing employs a plurality of individual sensors.

6. A method according to claim 1, further including verifying said sensed data with respect to a CAD data base of the part.

7. A method according to claim 1, wherein said support members are capable of axial adjustment.

8. A method according to claim 1, wherein said location is sensed in more than two axes with respect to said base.

9. A method according to claim 1, further including verifying said sensed data with respect to a support member data base derived from a CAD data base of said part.

10. A method according to claim 1, wherein said adjusting is accomplished in two or more axes.

11. A method according to claim 1, wherein said adjusting is accomplished by adjusting said part support members linearly or angularly.

12. A method according to claim 1, wherein said adjusting is accomplished in more than three axes.

13. A method according to claim 1, further including locking said part support member in place after said adjusting.

14. A method according to claim 1, wherein at least one of said support members includes a locating detail with a specialized face.

15. A method according to claim 14, wherein the locating surface of said support is angularly adjustable.

16. A method according to claim 15, wherein the angular adjustment of said support member is effected via a ball joint or gimbal.

17. A method according to claim 1, further comprising joining a part in said supported position to a further part.

18. A method according to claim 17, wherein said joining comprises welding.

19. A method according to claim 1, including the additional step of providing an operator display of support member locations.

20. A method of providing a fixture for holding an object comprising the steps of:

providing a base having a plurality of object holding details mounted thereon;

providing a data base of an object to be held by said fixture;

deriving data from said object data base to derive data concerning the positions of said object holding details of said fixture; and positioning at least one of said object holding details said base in accordance with said derived data to accommodate an object to be held by said fixture.

21. A method according to claim 20, further comprising sensing data related to the location of said object holding details.

22. A method
according to claim 21 wherein said positioning is effected robotically.

23. A method according to claim 22, further comprising sensing data related to the location of said object holding details.

24. A fixture for holding objects comprising:

a base;

a plurality of positionable object locating members attached to the base;

robotic means for positioning said one or more of said object locating members with respect to the base; and robot positioning control means responsive to design data concerning objects to be located by said fixture.

25. A fixture for holding objects comprising:

a base;

a plurality of positionable object locating members attached to the base;

means for sensing the location of at least one of said object locating members;

means for automatically adjusting the position of at least one of said object locating members, said adjustment means being responsive to the sensed location thereof; and means for displaying to an operator information concerning positioning of said locating members to accommodate said object.

26. A fixture according to claim 25, wherein said display provides information derived from design data concerning an object to be located by said fixture.

27. A fixture according to claim 25, wherein said adjustment means is responsive to design data of an object to be located by said fixture.

28. A fixture according to claim 25, further including means for locking said object locating member in place.

29. A fixture according to claim 25, further including means for attaching said object location members to said base at a variety of locations.

* * * * *

UNITED STATES PATENT AND TRADEMARK OFFICE
CERTIFICATE OF CORRECTION

PATENT NO. : 5,721,677
DATED     : February 24, 1998
INVENTOR(S) : PRYOR

It is certified that error appears in the above-indentified patent and that said Letters Patent is hereby corrected as shown below:

Claim 20, tenth line, after "details" insert --on--.

Claim 22, second line, delete "21" and insert --20--.

Claim 29, second line, delete "location" and insert --locating--.

Signed and Sealed this

Seventh Day of July, 1998

Attest:

BRUCE LEHMAN

*Attesting Officer*   *Commissioner of Patents and Trademarks*